(12) United States Patent
Lindahl

(10) Patent No.: US 11,976,964 B2
(45) Date of Patent: May 7, 2024

(54) SYSTEM FOR QUANTIFYING A COLOUR CHANGE

(71) Applicant: Intellego Technologies AB, Solna (SE)

(72) Inventor: Claes Lindahl, Solna (SE)

(73) Assignee: INTELLEGO TECHNOLOGIES AB (SE)

( * ) Notice: Subject to any disclaimer, the term of this patent is extended or adjusted under 35 U.S.C. 154(b) by 0 days.

(21) Appl. No.: 17/792,083

(22) PCT Filed: Jan. 13, 2021

(86) PCT No.: PCT/EP2021/050530
§ 371 (c)(1),
(2) Date: Jul. 11, 2022

(87) PCT Pub. No.: WO2021/144288
PCT Pub. Date: Jul. 22, 2021

(65) Prior Publication Data
US 2023/0057131 A1     Feb. 23, 2023

(30) Foreign Application Priority Data
Jan. 13, 2020    (GB) ...................... 2000458

(51) Int. Cl.
*G01J 1/02*     (2006.01)
*G01J 1/50*     (2006.01)
*G01N 21/78*    (2006.01)

(52) U.S. Cl.
CPC ........... *G01J 1/0219* (2013.01); *G01J 1/0233* (2013.01); *G01J 1/50* (2013.01); *G01N 21/78* (2013.01); *G01N 2201/0221* (2013.01)

(58) Field of Classification Search
CPC .......... G01J 1/0219; G01J 1/0233; G01J 1/50; G01N 21/78; G01N 2201/0221
See application file for complete search history.

(56) References Cited

U.S. PATENT DOCUMENTS 7,262,779 B1   8/2007   Sones
10,060,787 B2 *  8/2018   Balooch ................... G01J 1/50
(Continued)

FOREIGN PATENT DOCUMENTS

| CN | 103792196 A | 5/2014 |
| CN | 105738292 A | 7/2016 |

(Continued)

OTHER PUBLICATIONS

International Search Report and the Written Opinion of the International Searching Authority corresponding to International Patent Application No. PCT/EP2021/050530 (11 pages) (mailed Apr. 1, 2021).

(Continued)

*Primary Examiner* — Peter D McLoone
(74) *Attorney, Agent, or Firm* — Myers Bigel, P.A.

(57) ABSTRACT

A system (5) for quantifying a colour change in a colorimetric indicator (15), the system (5) comprises an image capture device (22) configured to acquire an image of an object (10) comprising the colorimetric indicator (15); and a processing device (20) configured to compare the acquired image to reference data (30) associated with the colourimetric indicator (15), and generate a quantitative output (28) associated with the acquired image.

20 Claims, 13 Drawing Sheets

(56) References Cited

U.S. PATENT DOCUMENTS

| | | |
|---|---|---|
| 11,436,758 B2 * | 9/2022 | Ko ........................... G06T 7/90 |
| 2012/0063652 A1 | 3/2012 | Chen et al. |
| 2012/0137958 A1 | 6/2012 | Mills et al. |
| 2014/0120563 A1 | 5/2014 | Ozcan et al. |
| 2014/0315229 A1 | 10/2014 | Karlsson et al. |
| 2015/0211987 A1 | 7/2015 | Burg et al. |
| 2015/0359458 A1 | 12/2015 | Erickson et al. |
| 2016/0048739 A1 | 2/2016 | Burg |
| 2016/0139156 A1 | 5/2016 | Lakdawala |
| 2017/0184506 A1 | 6/2017 | Patel |
| 2017/0191866 A1 | 7/2017 | Balooch et al. |
| 2019/0145889 A1 | 5/2019 | Cunningham et al. |
| 2021/0208081 A1 * | 7/2021 | Tayfun ................. G01N 33/573 |

FOREIGN PATENT DOCUMENTS

| | | |
|---|---|---|
| CN | 109596215 A | 4/2019 |
| GB | 2576942 A | 3/2020 |
| JP | 2007101482 A | 4/2007 |
| KR | 20180055320 A | 5/2018 |
| WO | 2010070290 A1 | 6/2010 |
| WO | 2012158000 A2 | 11/2012 |
| WO | 2015038717 A1 | 3/2015 |
| WO | 2019001971 A1 | 1/2019 |
| WO | 2019221676 A1 | 11/2019 |

OTHER PUBLICATIONS

Yetisen et al. "A smartphone algorithm with inter-phone repeatability for the analysis of colorimetric tests" Sensors and Actuators B: Chemical, 196:156-160 (2014).

* cited by examiner

SYSTEM FOR QUANTIFYING A COLOUR CHANGE

FIELD OF THE INVENTION

The present invention relates to systems and methods for quantifying a colour change. In particular, but not exclusively, the invention relates to systems and methods for providing a quantified output representative of a colour change in a colorimetric indicator.

BACKGROUND

Many products exist, that provide a visual indication (through a colour change) of exposure to a certain amount of a particular compound or radiation. Such products typically include one or more colourimetric indicator. For example, colourimetric indicators rely on the optical properties of reactive dyes or inks. These dyes can exist in at least two different chemical states, with each form of the dye absorbing light in a particular range of wavelength. When such a reactive dye existing in a first form is exposed to a given substance, it reacts with the substance via a reversible chemical reaction, thereby turning into a second form of the dye. As the second form of the dye absorbs light at a different wavelength, the chemical reaction provides a colour change which is visible by an observer. Colourimetric indicators may be configured to display reversible colour changes or irreversible colour changes, depending on their intended use, and the chemical substance, radiation or stimulus causing the colour change in the indicator. An example of a colourimetric indicator reactive to irradiation by ultraviolet radiation (UVR) is disclosed in WO 2010/070290 (Mills et al), which is incorporated herein by reference.

Exposing a surface to a given type of radiation may be either desired or deliberate, or may be undesirable or unintentional.

For example, whilst exposure of one's skin to direct sunlight may desired and to some extent beneficial, overexposure to ultraviolet radiation is a recognised health hazard. Certain products exist, such as stickers or wristbands marketed under the name Smartsun™, which include a colourimetric indicator that displays a colour change after exposure to a certain type and/or quantity of UV radiation. This provides a user with a visual indication associated with exposure to a predetermined amount of UV radiation.

In another example related to sterilization and disinfection, products include a colorimetric indicator that displays a colour change after exposure to a certain amount of UVC radiation. This provides a user with a visual indication associated with exposure to UVC radiation. UVC irradiation is a known technique for and disinfecting and sterilizing surfaces, for example in a medical environment or in the foodstuff industry.

Other products rely on colourimetric indicators that exhibit a colour change when exposed to a particular compound or chemical substance, such as carbon dioxide, oxygen, ammonia, or the like. These can be useful, for example, in the food industry.

Whilst products incorporating a colourimetric indicator provide a useful indication of potential exposure to a given type of radiation, stimulus, or chemical substance, a challenge with these systems is that visual evaluation of a given colour change can be difficult and may be subject to interpretation, which can be potentially counter-productive or even dangerous when subsequent decisions are based on such evaluation.

Certain systems have attempted to provide a quantified assessment representative of a colour change associated with a colourimetric indicator. An example of such a system is disclosed in US 2017/0191866 A1 (Balooch et al) which discloses a system for determining personal ultra-violet (UV) radiation measurements, comprising: a measurement device configured to measure UV irradiation; and a terminal device configured to receive or capture an output of the measured UV irradiation from the measurement device. However, the measurement device configured to measure UV radiation exposure includes a surface that includes not only a plurality of different sections that each have a different sensitivity to UV radiation exposure, but also a plurality of different fixed reference colors to each indicate a different corresponding UV exposure level, the plurality of different fixed reference colors being embedded among and intermingled with the plurality of different sections that each have a different sensitivity to UV radiation exposure. Thus, the system relies on the capture of an image having both a colour-changing region and a fixed reference colours region, which may therefore suffer from potential inconsistency and lack of reliability. Indeed, fixed colour reference regions may fade, discolour, or be damaged over time or during use. Further, a captured image of such reference regions may appear different under different conditions such as incident light, angle, or the like.

It is an object of the invention to address and/or mitigate one or more problems associated with the prior art.

SUMMARY

According to a first aspect there is provided a system for quantifying a colour change in a colorimetric indicator, the system comprising:
an image capture device configured to acquire an image of an object comprising a colorimetric indicator; and
a processing device configured to compare the acquired image to reference data associated with the colourimetric indicator, and generate a quantitative output associated with the acquired image.

Advantageously the output may be representative of a colour change in the colourimetric indicator.

Typically, the colorimetric indicator may be provided on a surface of the object. The image capture device may be configured to capture or acquire an image of a surface of the object comprising the colorimetric indicator.

The colorimetric indicator may be provided under the surface of the object, e.g., within a bulk portion of the object. The image capture device may be configured to capture an image of the object comprising the colorimetric indicator. In such instance, the bulk material of the object comprising the colourimetric indicator may be substantially transparent and/or translucent so as to allow visual observation of the colourimetric indicator.

The reference data may be specific to the colourimetric indicator. A colourimetric indicator may be associated with a respective set of reference data.

The processing device may comprise reference data associated with the colourimetric indicator. The processing device may comprise hardware comprising reference data associated with the colourimetric indicator. The processing device may comprise a plurality of reference data sets each associated with a respective colourimetric indicator.

The processing device may be capable of accessing reference data, e.g. the reference data associated with the colourimetric indicator, e.g. may be capable of accessing reference data stored remotely from the processing device. For example, the processing device may be capable of accessing the reference data by wired, Bluetooth, or Wi-Fi connection, and/or by any other type of connection. The reference data may be stored on a remote server, network attached storage (NAS), a data store and/or the like.

The processing device may be capable of accessing a plurality of reference data sets each associated with a respective colourimetric indicator.

The colourimetric indicator may be capable of exhibiting a colour change in response to exposure to radiation, to a chemical substance or compound, or to any other stimulus. The colourimetric indicator may be capable of exhibiting a colour change in response to exposure to UV radiation, e.g. to UVA, UVB and/or UVC radiation. The colourimetric indicator may be or may comprise a UV indicator.

In an embodiment, the colourimetric indicator may be a UVA and/or UVB indicator. The object may be a sunburn indicator, which may be provided in the form of a wearable item such as a band, patch, sticker, tape, or the like.

In another embodiment, the colourimetric indicator may be a UVC indicator. The object may be a disinfection indicator and/or a sterilisation indicator.

The colourimetric indicator may have a first state associated with a first colour. The first state and/or first colour may be associated with an absence of colour change. For example, the first state and/or first colour may be associated with the absence of exposure of the indicator to a corresponding chemical substance, radiation or stimulus or to the exposure of the indicator to a corresponding chemical substance, radiation or stimulus below a predetermined and/or threshold activation level.

The colourimetric indicator may have a second state associated with a second colour. The second state and/or second colour may be associated with a full or final colour change. For example, the second state and/or second colour may be associated with full exposure of the indicator to a corresponding chemical substance, radiation or stimulus or to the exposure of the indicator to a corresponding chemical substance, radiation or stimulus above a predetermined and/or upper activation level.

The colourimetric indicator may have one or more intermediate states each associated with a corresponding intermediate colour. The one or more intermediate states and/or one or more intermediate colours may be or may comprise one or more states and/or colours between the first state and/or first colour and the second state and/or second colour. Each intermediate state and/or intermediate colour may be associated with a predetermined level of exposure to a stimulus, e.g. radiation and/or chemical substance.

Each of the first state and/or first colour, intermediate state(s) and/or intermediate colour(s), and second state and/or second colour, may each correspond to a be associated with a predetermined level of exposure to a stimulus, e.g. radiation and/or chemical substance. The colourimetric indicator may have one or more additional states.

The system may comprise or may be comprised in a portable user device, such as a mobile/cell phone, smartphone, tablet computer, laptop, phablet, smart assistant, and/or the like. The image capture device and/or processing device may be an image capture device and/or processing device of the portable user device.

The system may comprise or may be comprised in a monitoring apparatus.

The monitoring apparatus may be a static monitoring apparatus which may include one or more image capture devices and one or more processing devices. For example, the static monitoring apparatus may include one or more image capture devices which be disposed at set locations, for example in or around a room, laboratory, corridor, open space, etc.

The monitoring apparatus may be a mobile monitoring apparatus which may include one or more image capture devices and one or more processing devices. In such instance, the mobile monitoring apparatus may be or may comprise a robot which may be capable of moving within a predetermined area. For example, the robot may be programmed or may be capable of moving within a room and may be capable of detecting the object or a number of such objects. The robot may comprise one or more cameras allowing the robot to detect one or more objects, for example by detecting a reference mark on the object such as a QR code, barcode or the like. Once an object is detected, the robot may be configured to acquire an image of the object as described above.

The robot may be configured to compare the acquired image to reference data associated with the colourimetric indicator, and generate a quantitative output associated with the acquired image. Alternatively, the robot may be configured to store the acquired image, and the comparison of the acquired image to reference data associated with the colourimetric indicator, and generation of a quantitative output associated with the acquired image may be carried out separately. In other words, the processing device may be part of, or may be provided separate from, the mobile monitoring apparatus, e.g. robot.

Advantageously, the mobile monitoring apparatus, e.g. robot, may comprise the image capture device and the processing apparatus. By such provision, the mobile monitoring apparatus, e.g. robot, may be capable of acquiring an image of the object and of comparing the acquired image to reference data associated with the colourimetric indicator and generating a quantitative output associated with the acquired image.

The mobile monitoring apparatus, e.g. robot, may be configured to take an action, for example sending a signal or command, based on the quantitative output. For example, when the object comprises a UVC indicator, the mobile monitoring apparatus, e.g. robot, may be capable of sending a signal or command to alter or adjust a dose of UVC irradiated in the location of the object. This may be particularly advantageous in a medical environment where sustained or substantially continuous levels of sterilization may be desirable. Thus, if the quantitative output generated by the mobile monitoring apparatus, e.g. robot, is below a predetermined level, the mobile monitoring apparatus, e.g. robot, may send a command or signal that may trigger an increase in the level or dose of UVC in or near the location of the object. If the quantitative output generated by the mobile monitoring apparatus, e.g. robot, is above below a predetermined level, the mobile monitoring apparatus, e.g. robot, may send a command or signal that may trigger a decrease in the level or dose of UVC in or near the location of the object. If the quantitative output generated by the mobile monitoring apparatus, e.g. robot, is at or near a predetermined level, the mobile monitoring apparatus, e.g. robot, may either not send any a command or signal or may send a command or signal that may trigger maintenance of the level or dose of UVC in or near the location of the object.

The processor may be suitably programmed using computer code, e.g. embodied in an app, applet, script or other computer code to operate in the manner described above.

Typically, the image capture device may comprise or may be a camera. The image capture device may form part of an electronic device such as a mobile/cell phone, smartphone, or the like.

The processing device may comprise or may be an app. The processing device may comprise or may be provided in an electronic device such as a mobile/cell phone, smartphone, or the like.

The image capture device and the processing device may be provided in or may be supported by a portable electronic device such as a mobile/cell phone, smartphone, or the like. Alternatively, the image capture device and the processing device may be may be provided in or may be supported by separate devices.

The processing device may be configured to perform image analysis of the captured image.

The processing device may be configured to compare the captured image with the reference data associated with the colourimetric indicator.

The processing device may be configured to compare the colour of the captured image with the colours of the reference data associated with the colourimetric indicator.

The colours of the reference data, e.g. each of the first colour, intermediate colour(s), and second colour, and optionally of one or more additional colours, may be stored, expressed and/or converted in a standard and/or uniform colour scale, e.g. from any known colour standard. Typically, the colours of the reference data may be expressed and/or stored in a standard and/or uniform colour scale.

The colour(s) of the captured image, e.g. of the colourimetric indicator, may be converted, expressed and/or stored, e.g. by the processing device, in a standard and/or uniform colour scale, e.g. from any know colour standard. Typically, the colour(s) of the captured image, e.g. of the colourimetric indicator, may be converted by the processing device into a standard and/or uniform colour scale, and optionally stored by the processing device in a standard and/or uniform colour scale. Conveniently, the colours of the reference data and/or the colour of the captured image may be stored, expressed and/or converted in a 'L*a*b*' colour scale. In the L*a*b* scale, a colour is expressed by three numerical values: L*, a* and b*; where L* represents lightness from black (0) to white (100), a* represents a green/red value from green (−) to red (+), and b* represents a blue/yellow value from blue (−) to yellow (+). Advantageously, the use of the 'L*A*B*' scale allows an amount of visually perceived change in colour to be objectively, consistently and reliably expressed or converted into a corresponding amount of numerical change in the L*a*b* colour values.

Using the L*a*b* scale, a change in colour is expressed as delta values $\Delta L^*$, $\Delta a^*$ and $\Delta b^*$, allowing the total colour difference $\Delta E^*$ to be calculated, representative of the overall colour change.

The processing device may be configured to compare the colour of the captured image expressed in the L*a*b colour scale to the colours of the reference data expressed in the L*a*b colour scale.

The processing device may be configured to calculate a change in colour in the colourimetric indicator by calculating the colour difference value $\Delta E^*$ between the colour of the captured image and the first colour in the reference data.

The system, e.g. processing device, may generate a quantitative output associated with the colour of the captured image, and/or associated with the colour change. Advantageously, the quantitative output may be representative of the colour change in the colourimetric indicator.

Advantageously, generation of a quantitative output may allow the system to provide a reliable and consistent assessment of the colour of a colourimetric indicator, in use.

The quantitative output may comprise or may be expressed as an alphanumerical value. For example, if the colour of the captured image is substantially similar to the first colour in the reference data, the quantitative output may be a numeral value such as '0' or '1', or may comprise a word or text such as "PASS" or "SAFE" or "NO CHANGE". If the colour of the captured image is substantially similar to the first colour in the reference data, the quantitative output may be a numeral value such as '0' or '1', or may comprise a word or text such as "PASS" or "SAFE" or "NO CHANGE", or any other meaningful output associated with the first colour.

If the colour of the captured image is substantially similar to the second colour in the reference data, the quantitative output may be a numeral value such as '5', '10', '100' or any other chosen number that may represent an upper end of the colour scale, or may comprise a word or text such as "FAIL" or "UNSAFE", or any other meaningful output associated with the second colour.

The system, e.g. processing device, may generate a quantitative output associated with one or more intermediate colours. If the colour of the captured image is substantially similar to or closest to an intermediate colour in the reference data, the quantitative output may be a numeral value such as '1', '2', '3', '4', or any other number, or may comprise a word or text such as "PASS", "FAIL", "SAFE", "UNSAFE", or any other meaningful output associated with the respective intermediate colour. Each intermediate colour may be associated with or may have a corresponding quantitative output.

Thus, a respective quantitative output may be generated by the processing device when the colour of the captured image if substantially identical to or is within a predetermined level of likeness to the first colour, second colour or any of the intermediate colours.

The object may further comprise at least one reference colour region. The at least one reference colour region may correspond to the first colour, the second colour, and any of the intermediate colours. By such provision, in use, a user or observer may be able to obtain both a quantitative output from the system, and a visual assessment by comparing the colour of the indicator to the colour of the at least one reference colour region. One of more of the at least one reference colour region may comprise or may be associated with information, e.g. in alphanumerical language, qualifying the colour of the/each reference colour region(s).

The system, e.g. processing device, may also be configured to capture an image of the at least one reference colour region. The colour of one or more reference regions may be converted, expressed and/or stored, e.g. by the processing device, in a standard and/or uniform colour scale, e.g. a L*a*b colour scale. The system, e.g. processing device, may be configured to compare the colour of the captured image of the indicator expressed in the L*a*b colour scale to the colour(s) of the reference regions expressed in the L*a*b colour scale. The processing device may be configured to calculate a change in colour in the colourimetric indicator by calculating the colour difference value $\Delta E^*$ between the colour of the captured image of the indicator and the colour of the captured image in one or more reference regions. The system, e.g. processing device, may generate a quantitative output, e.g. a second quantitative output, associated with the colours of the captured image between the indicator and the at least one reference region. This may provide a further quantitative assessment in addition to the first quantitative assessment based on the reference data.

The system, e.g. image capture device, may be configured to illuminate the object, e.g. during image capture. Advantageously, the system, e.g. image capture device, may be configured to illuminate the object at a predetermined light intensity, for example at about 5-500 lumen, e.g. about 10-100 lumen. Conveniently, the system, e.g. image capture device, may be configured to illuminate the object using a camera flash, e.g. the flash of the camera used to capture the image. Advantageously, illuminating the object at a predetermined light intensity at the time of image capture may improve the consistency and reliability of the colour(s) measured by the system or image capture device. The system, e.g. processing device, may be configured to normalise the captured image. The system, e.g. processing device, may be configured to adjust colour measurement of the captured image, e.g. of the indicator region, based on ambient light conditions, such as brightness. Normalisation may be performed by capturing an image of a normalisation region. The normalisation region may typically comprise a plurality of portions, each portion corresponding to a specific colour. Typically, the normalisation region may comprise a grey-scale region. The normalisation region, e.g. may comprise a plurality of distinct grey-scale portions, for example three portions such as a white portion, a 50% grey portion and a black portion. The normalisation region, e.g. grey-scale region, may comprise a single grey-scale portion, which in an embodiment may have a colour value in CMYK of C51, M43, Y30 and K59. Without wishing to be bound by theory, it is believed that the apparent brightness to an observer of a matt grey surface is independent from the observer's viewing angle. Thus, the provision of a grey-scale reference region provides a standard portion for normalisation during image capture. In addition to providing a means for measuring exposure, a grey scale reference region may provide a convenient reference for white balance, or colour balance, allowing the processing device to compensate the system for varying illumination sources at the time of image capture.

According to a second aspect there is provided a system for quantifying a colour change in a colorimetric indicator, the system comprising:

an object comprising a colourimetric indicator;

an image capture device configured to acquire an image of the object and/or of the colourimetric indicator; and a processing device configured to compare the acquired image to reference data associated with the colourimetric indicator, and generate a quantitative output associated with the acquired image.

The features described in relation to the system according to the first aspect may apply in relation to the system according to the second aspect, and are not repeated here merely for brevity.

According to a third aspect there is provided a method for quantifying a colour change in a colorimetric indicator, wherein the method comprises:

acquiring an image of an object comprising a colorimetric indicator;

comparing the acquired image to reference data associated with the colourimetric indicator; and generating a quantitative output associated with the acquired image.

The method may comprise acquiring the image using an image capture device.

The method may comprise processing the image using a processing device. The method may comprise comparing the captured or acquired image to reference data using the processing device. The method may comprise generating the quantitative output using the processing device.

The method may comprise performing image analysis of the acquired image.

The method may comprise using the processing device to compare the acquired image with the reference data associated with the colourimetric indicator.

The method may comprise comparing the colour of the acquired image expressed in the L*a*b colour scale to the colours of the reference data expressed in the L*a*b colour scale.

The method may comprise calculating a change in colour in the colourimetric indicator by calculating the colour difference value $\Delta E^*$ between the colour of the acquired image and the first colour in the reference data.

The method may comprise generating a quantitative output associated with the colour of the acquired image, and/or associated with the colour change. Advantageously, the method may comprise generating a quantitative output representative of the colour change in the colourimetric indicator.

The method may comprise storing information, data or file associated with one or more the acquired image, colour values (e.g., in L*a*b* scale) derived from the acquired image, and/or quantitative output associated with the colour of the acquired image.

The method may be implemented using the system of the first or second aspect, the computer program of the fourth aspect, the processing device of the fifth aspect, the computer-readable storage medium of the sixth aspect, and/or the computer program of the seventh aspect.

The method may comprise the preliminary step of selecting the type of object or indicator to be captured by the image capture device. This may be particularly useful when the image capture device is capable of capturing an image of different types of objects, e.g. having different features, colours, shapes and/or indicators. The method may include selecting an object or indicator amongst a pool of available objects or indicators. Each type of object or indicator may be associated with a respective set of reference data which the image capture device or processing is configured to use to generate a quantitative output for the selected indicator.

The method may comprise locating the image capture device relative to the object before acquiring the image. The method may comprise using a template, e.g. an electronic template, on the image capturing device in order to locate the image capture device relative to the object. Conveniently, the method may comprise using the template to superimpose the template with the object, e.g. on the screen of the device. Advantageously, this may improve the reliability of the image capture by ensuring the conditions under which an image is captured, e.g. angle, distance, etc, are consistent.

The method may comprise normalising the captured image. The method may comprise adjusting colour measurement of the object, e.g. indicator, based on ambient light conditions, such as brightness. The method may comprise capturing an image of a normalisation region, which may include a plurality of portions of different colours, such as white, grey and black. The method may include normalising the captured image during image processing of the image by the device, or during subsequent post processing of the captured image.

The features described in relation to the apparatus according to the first aspect or second aspect, or in relation to any other aspect, may apply in relation to the method according to the third aspect, and are not repeated here merely for brevity.

According to an fourth aspect there is provided a computer program comprising instructions which, when the program is executed by a processing device, causes the processing device to:

acquire an image of an object comprising a colorimetric indicator;

compare the acquired image to reference data associated with the colourimetric indicator; and generate a quantitative output associated with the acquired image.

The computer program may be comprised in a computer program product, which may comprise or be comprised on a non-transient, computer readable medium, which may be a physical carrier medium. The instructions, when the program is executed by a processing device, may cause the processing device to control an image capturing device to acquire an image of an object comprising a colorimetric indicator, to compare the acquired image to reference data associated with the colourimetric indicator; and to generate a quantitative output associated with the acquired image.

The features described in relation to any of the other aspects may apply in relation to the computer program according to the fourth aspect, and are not repeated here merely for brevity.

According to a fifth aspect there provided a processing device comprising at least one processor, data storage and a communication system, the data storage storing the computer program of the fourth aspect and the at least one processor being configured to process the computer program product of the fourth aspect, e.g. to carry out the method of the third aspect. The data storage may also contain metadata associated with the indicator such as facility name or number, room name or number and location of indicator and the like.

The features described in relation to any of the other aspects may apply in relation to the computer program according to the fifth aspect, and are not repeated here merely for brevity.

According to a sixth aspect of the present disclosure is a computer-readable storage medium comprising the computer program of the fourth aspect. The computer readable storage medium may be a non-transient, physical storage medium.

According to a seventh aspect of the present disclosure is a computer program comprising instructions which, when the program is executed by a processing device, causes the processing device to carry out the steps of the method of the third aspect.

It will be appreciated that the features described in relation to any aspect of the invention may also apply to any other aspect.

BRIEF DESCRIPTION OF DRAWINGS

Embodiments of the present disclosure will now be given by way of example only, and with reference to the accompanying drawings, which are.

DETAILED DESCRIPTION

Figure 1:
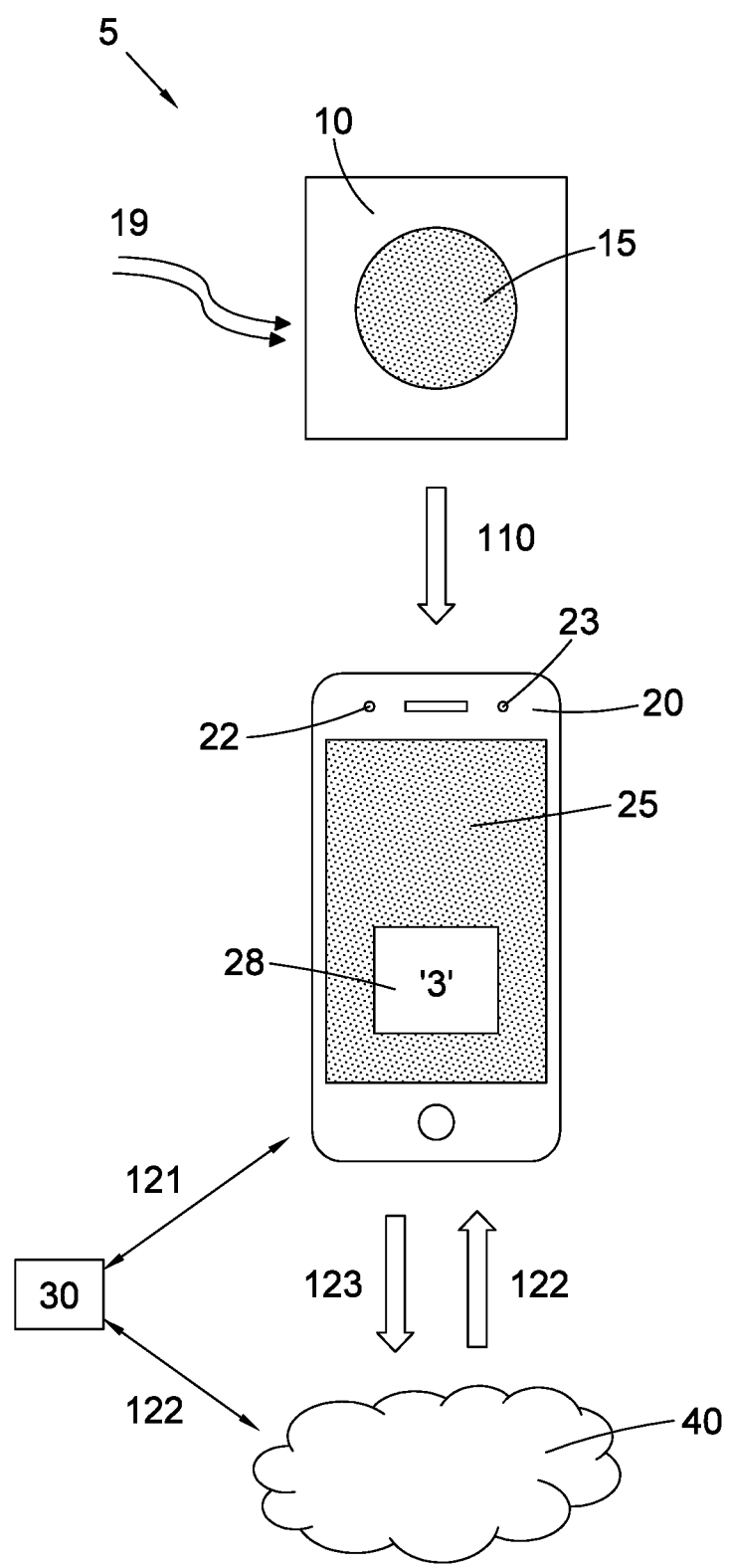
FIG. 1 a schematic view of a system according to an embodiment.

Referring to FIG. 1 there is shown a system for quantifying a colour change, generally designated 5, according to a first embodiment.

The system 5 includes an image-capturing device 22, which in this embodiment is a camera.

The system 5 also includes a processing device 20, which in this embodiment is supported by a smartphone.

The image-capturing device 22 is configured to acquire an image of an object 10, which in this embodiment is a patch or a card having on its surface a region having a colourimetric indicator 15. In FIG. 1, the step of acquiring the image is represented by arrow 110. There is also provided an illumination means 23, e.g. a flash 23, to illuminate the object at the time of image capture, which may improve the reliability of the image capture.

In use, the colourimetric indicator 15 is configured to change colour upon exposure to UV radiation 19. It will be understood that, in other embodiments, the indicator may be chosen to change colour upon exposure to another type of stimulus, such as in response to exposure to a different type of radiation or to a chemical compound or substance.

The processing device is configured to compare the captured image to reference data 30 associated with the colourimetric indicator 15. The reference data is in digital/electronic form.

As shown in FIG. 1, the reference data 30 can be stored on the processing device 20 or connected directly to hardware comprising or being provided with the reference data 30. In such instance, the step of acquiring the image is represented by arrow 121.

As shown also in FIG. 1, the reference data 30 can be stored remotely from the processing device 20 such as in internet cloud 40, and can be accessed by any suitable wired or wireless connection such as Bluetooth or Wi-Fi. In such instance, the step of acquiring the image is represented by arrow 122.

In use, subsequent to acquisition of the image, the system 5 compares the acquired image of the indicator 15 to the reference data 30. Advantageously, in order to improve consistency and reliability, the processing device 20 converts or expresses the colour of the captured image into a standard and/or uniform colour scale, which in his embodiment is the 'L*a*b*' or 'CIELAB' colour scale. The processing device 20 then compares the colour of the acquired image to the reference data 30, which is also expressed in the same standard and/or uniform colour scale, e.g. 'L*a*b*' or 'CIELAB' colour scale. Comparison of the acquired image with the reference data 30 is explained in more details below.

Subsequent to the comparison step, the system 5, e.g. processing device 20, generates a quantitative output 28 associated with the colour of the acquired image and/or associated with the colour change of the indicator 15. In this embodiment, the quantitative output 28 is a numerical value ('3') that represents the level of colour change of the indicator 15 from an initial state (e.g., '1') to a final (full colour change, e.g., '5') state. The quantitative output 28 is displayed on a screen 25 of the processing device 20. The quantitative output 28 can be stored locally, e.g. on the processing device 20, or can be uploaded or stored remotely, for example on cloud 40, as shown by arrow 123.

Figure 10:
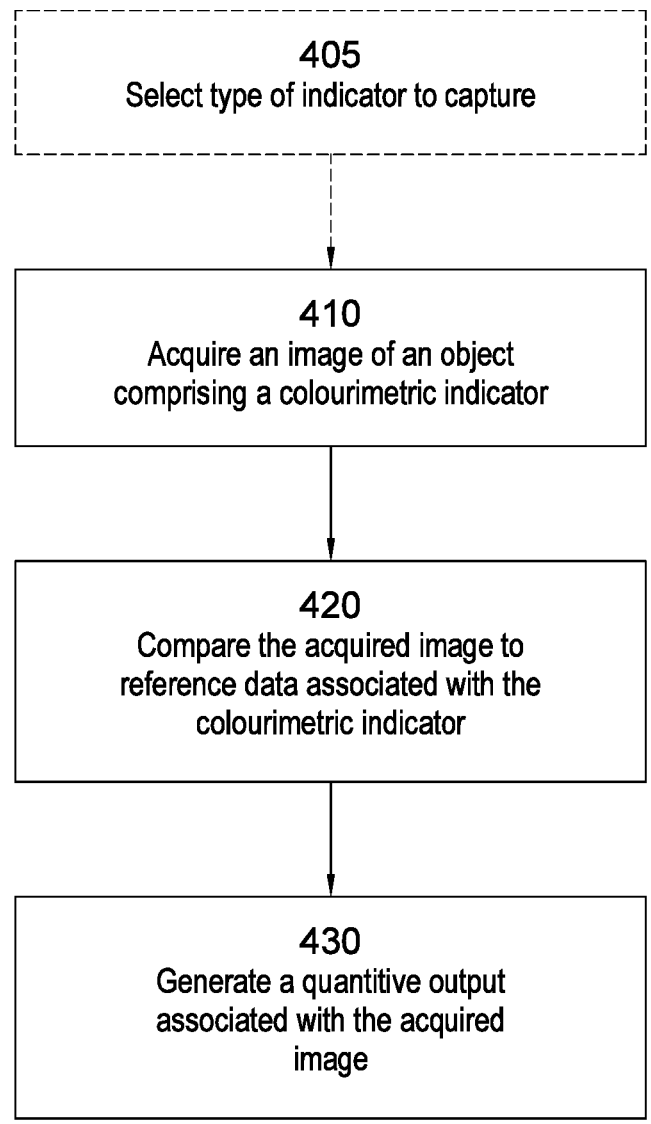
FIG. 10 a method of quantifying a colour change according to an embodiment.

A method for quantifying a colour change is illustrated in FIG. 10. The method comprises step 410 which comprises acquiring an image of an object comprising a colorimetric indicator. In step 420, the acquired image is compared to reference data associated with the colourimetric indicator. In step 430, a quantitative output associated with the acquired image is generated as a result of the comparison of step 420, which for example represents the colour change between the colour of the indicator in its initial or "unchanged" state, and the colour of the indicator in the acquired image.

Figure 13:
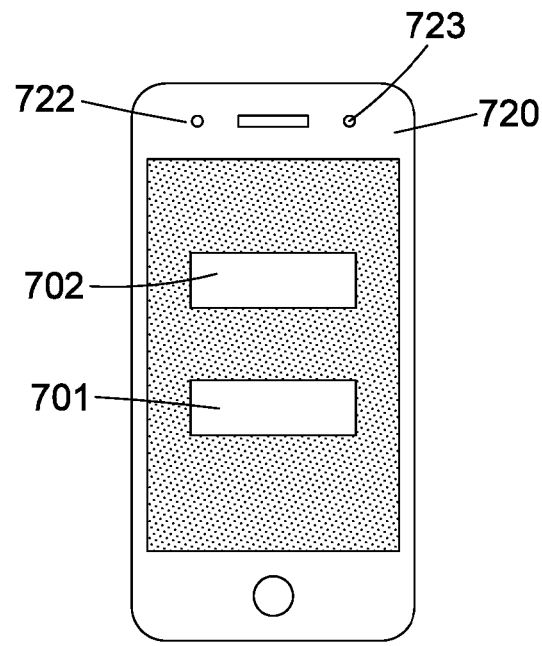
FIG. 13 an illustration of an optional step of a method of quantifying a colour change according to another embodiment.

The method of FIG. 10 may also include the preliminary (optional) step 405 of selecting the type of indicator to be captured by the device 20, 720, 820. This may be particularly useful when the processing device 20, 720, 820 is capable of capturing an image of different types of supports 10, 110, 210, 310, 610 having different features, shapes and/or indicators 15, 155, 215, 315, 615. Thus, in the example illustrating this step as shown in FIG. 13, step 405 includes selecting between two different types of indicators 701, 702. Each type of indicator 701, 702 will be associated with a respective set of reference data 30 which the processing device 20, 720, 820 will use to generate a quantitative output for the selected indicator 701, 702.

Figure 11:
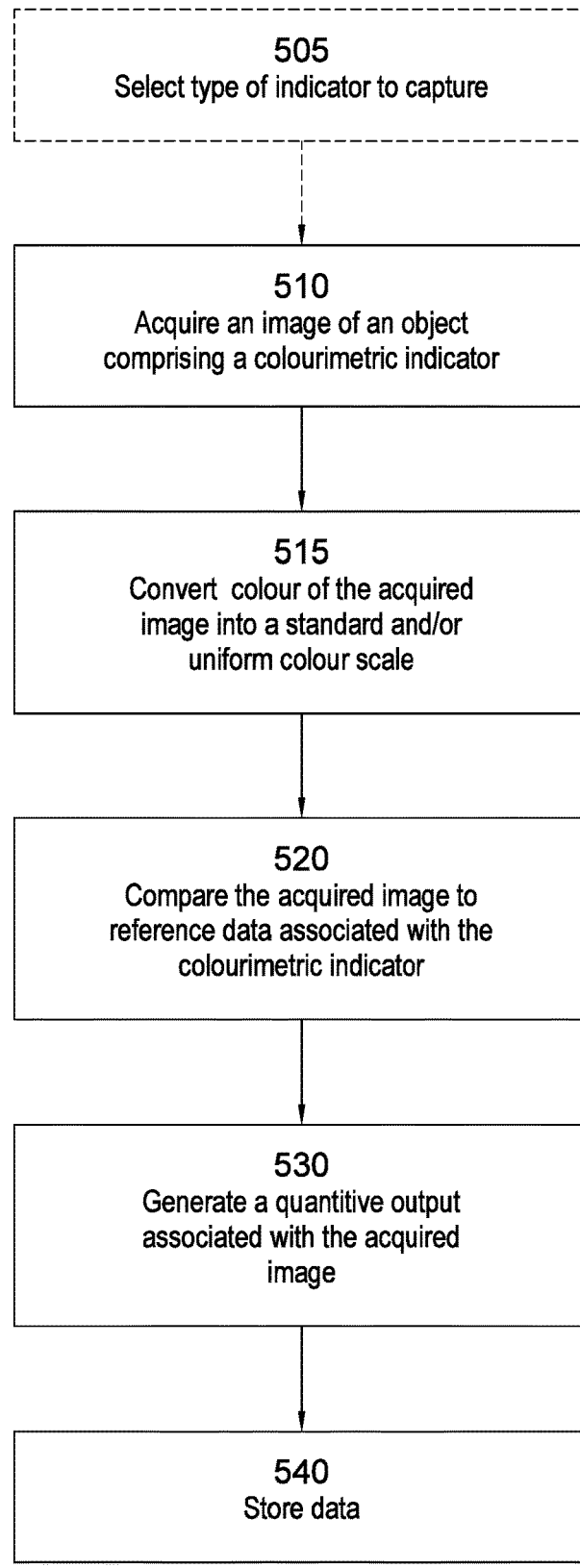
FIG. 11 a method of quantifying a colour change according to another embodiment

Another embodiment of a method for quantifying a colour change is illustrated in FIG. 11. The method of FIG. 11 is similar to the method of FIG. 10, like parts denoted by like numerals, incremented by '100'. However, in FIG. 11, the method, subsequent to acquiring image in step 510, comprises converting the colour of the acquired image and in particular of the colourimetric indicator thereof, into a standard and/or uniform colour scale such as L*a*b* scale, as represented by step 515. In step 520, the acquired image is compared to reference data associated with the colourimetric indicator, which reference data are also expressed in the same standard and/or uniform colour scale such as L*a*b* scale. In step 530, a quantitative output associated with the acquired image is generated, similarly to step 430 of FIG. 10. Finally, and optionally, in step 540, information, data or file(s) associated with one or more the acquired image, colour values (e.g., in L*a*b* scale) derived from the acquired image, and/or quantitative output associated with the colour of the acquired image, is/are stored either locally (e.g. on a hard drive) or remotely (e.g. on a remote server, cloud, network attached storage (NAS), data store or the like).

Methodology for Generation of Reference Data
Measurement Methods and Procedures

In the following examples, a UV colourimetric indicator was used.

The samples were exposed by UV-radiation at 254 nm wavelength using a UVP Trans-illuminator equipped with fluorescent UVC-tubes using two different irradiation levels (90 and 760 µW/cm² respectively). The irradiation level at the sample plane was determined by a calibrated silicon detector with a precision aperture in front of the detector's photosensitive surface. An aperture was used to limit the exposure to a well-defined spot of about ⌀20 mm on the samples.

At certain times corresponding to exposures of 10000, 25000, 50000, 75000 and 100000 µJ/cm², the exposure was briefly paused and the colour of the exposed area was measured using a PR-735 spectrophotometer. Also, a picture of the sample was taken. The measurements and pictures were taken with the sample placed in a light both using D65 illumination with high colour rendering index (>95).

Based on the colour coordinates in CIE 1976 L* a* b* colour space, the total colour difference ΔE* relative to a non-exposed sample was determined as:

$$\Delta E^* = \sqrt{(\Delta L^*)^2 + (\Delta a^*)^2 + (\Delta b^*)^2}$$

where ΔL*, Δa* and Δb* are the differences between the individual coordinates. Typically the human eye is capable of detecting a colour change when ΔE* is 1-2 or higher.

Measurement Conditions

Ambient temperature 23±2° C. Sample temperature (during exposure) 30±5° C. Exposure wavelength 254±2 nm Equipment:

Reference silicon detector 10 × 10 mm, inv. no. 500963
UVP Transilluminator 254 nm, no. 95-0153-02
Current amplifier Keithley 427, inv. no. 603159
Precision aperture Ø 8 mm, inv. no. 502607
Spectrophotometer PR-735, inv. no. 901491
Light booth True Color TC-60
Nikon D7000 digital camera Results The values resulting from the above measurements are shown in Table 1 and Table 2 below.

TABLE 1

Exposure with low irradiance (90 µW/cm²).

| Exposure | CIE 1976 L*a*b* colour coordinates | | | Colour difference |
|---|---|---|---|---|
| µJ/cm² | L* | a* | b* | ΔE* |
| 0 | 82.2 | −4.0 | 52.4 | 0.0 |
| 10000 | 77.8 | 6.3 | 40.9 | 16.0 |
| 25000 | 73.2 | 14.2 | 30.0 | 30.2 |
| 50000 | 69.4 | 21.3 | 18.4 | 44.3 |
| 75000 | 67.8 | 25.4 | 10.7 | 53.0 |
| 100000 | 66.4 | 27.8 | 5.4 | 58.9 |

TABLE 2

Exposure with high irradiance (760 µW/cm²)

| Exposure | CIE 1976 L*a*b* colour coordinates | | | Colour difference |
|---|---|---|---|---|
| µJ/cm² | L* | a* | b* | ΔE* |
| 0 | 83.0 | −4.8 | 52.5 | 0.0 |
| 10000 | 77.9 | 7.1 | 39.8 | 18.1 |
| 25000 | 73.5 | 16.0 | 28.0 | 33.5 |
| 50000 | 69.6 | 23.5 | 16.0 | 48.1 |
| 75000 | 66.3 | 28.0 | 8.0 | 57.7 |
| 100000 | 65.1 | 31.0 | 2.0 | 64.4 |

Figure 7:
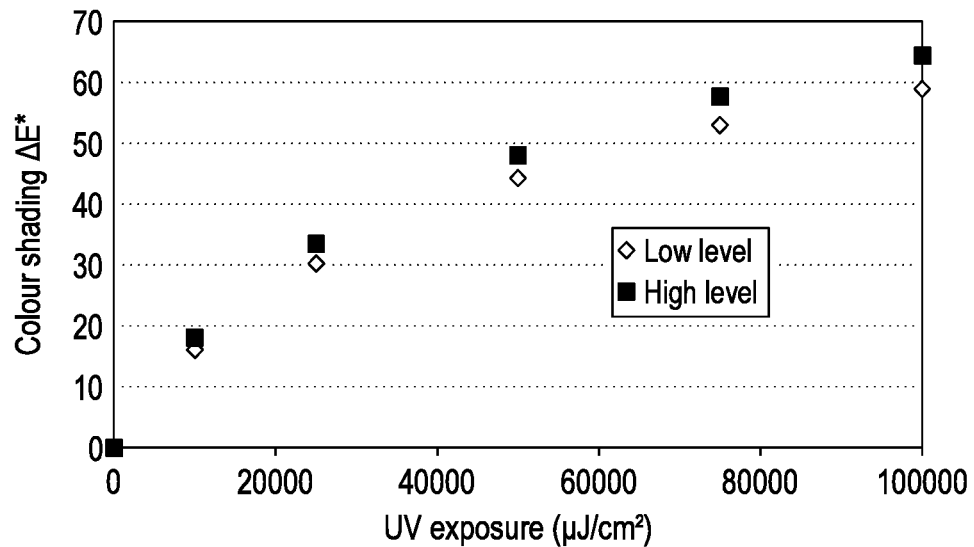
FIG. 7 a graph showing colour difference $\Delta E^*$ during generation of reference data for two different irradiation levels.

The results for ΔE* for the two irradiation levels are shown in FIG. 7. The results show that the change in colour after exposure to a certain dose of UV irradiation was very similar for the irradiation intensities of 90 and 760 µW/cm².

Figure 8:
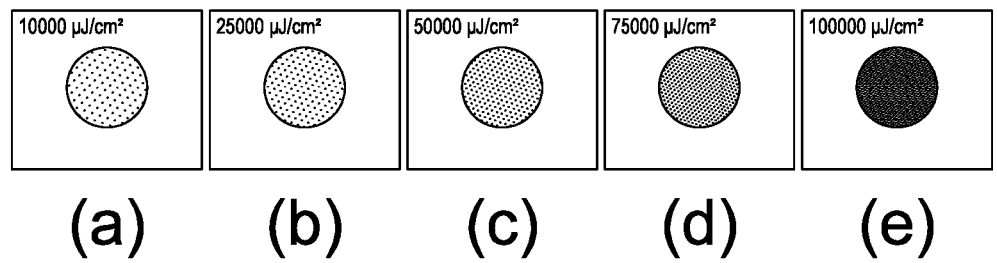
FIGS. 8 and 9 images of the exposed samples corresponding to the data points shown in FIG. 7.
Figure 9:
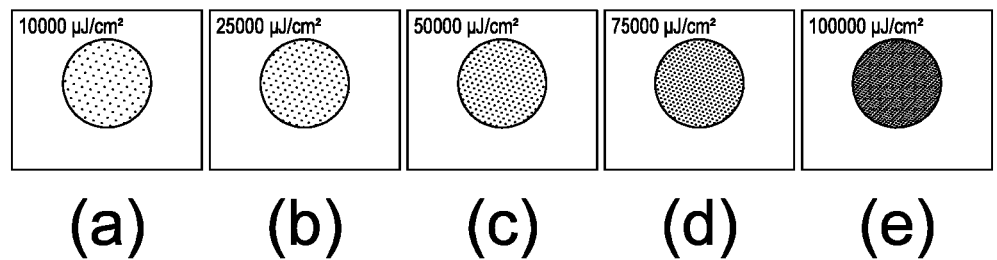

Corresponding images of the exposed samples are shown in FIGS. 8 and 9, clearly showing an increase in colour change of the indicator upon increased exposure to UV radiation.

The uncertainty is estimated to ±8% of the reported exposure levels. The relative uncertainty for L*, a* and b* is ±2.

It will be noted that no absolute uncertainty is given for L*, a* and b* as the measurement geometry is not well defined (detection about 15° normal to the sample surface, illumination close to diffuse).

EXAMPLES

Figure 2:
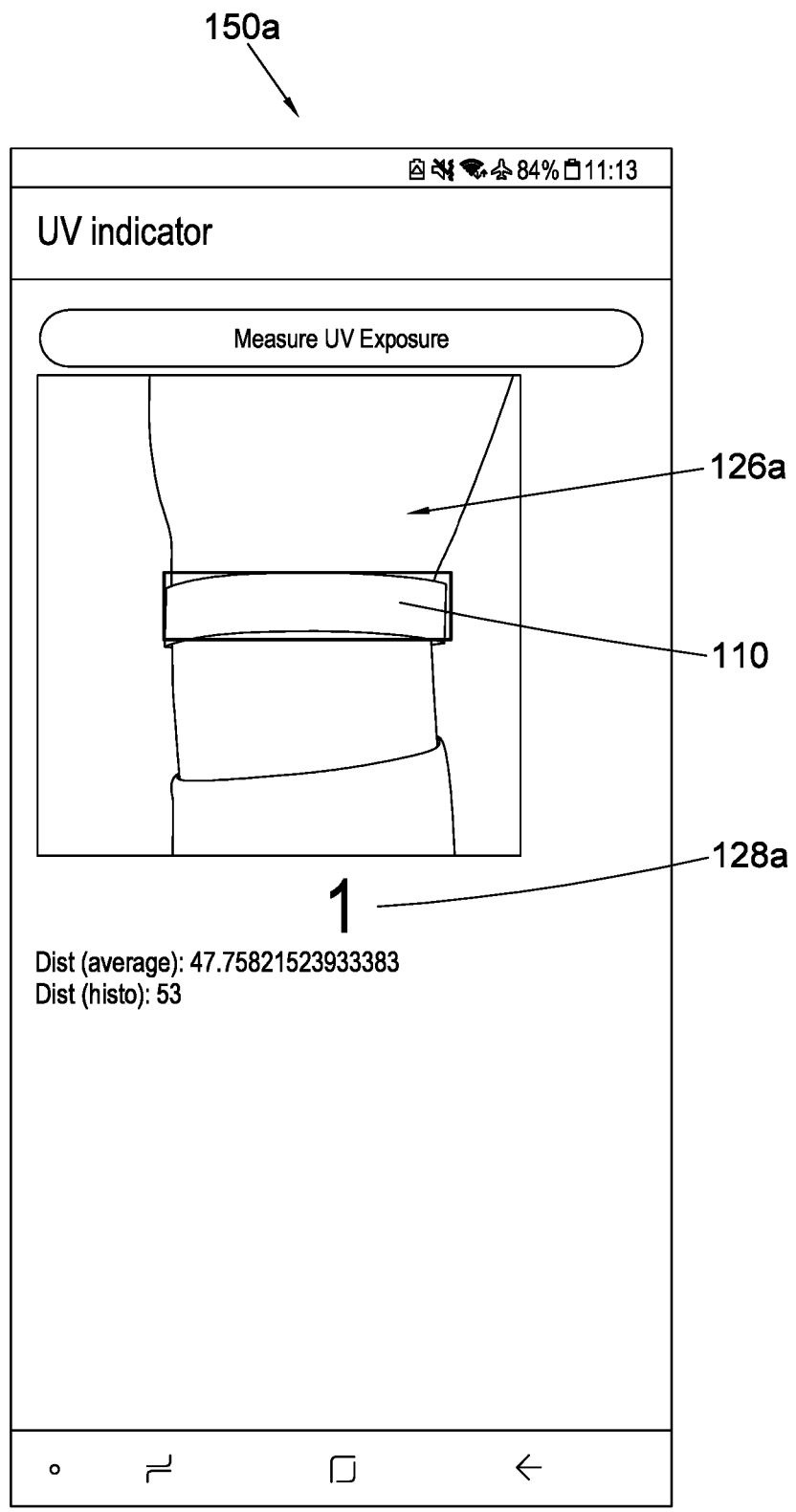
FIG. 2 a screenshot of an output using the system of FIG. 1 on a first indicator, before exposure of the indicator to UV radiation.
Figure 3:
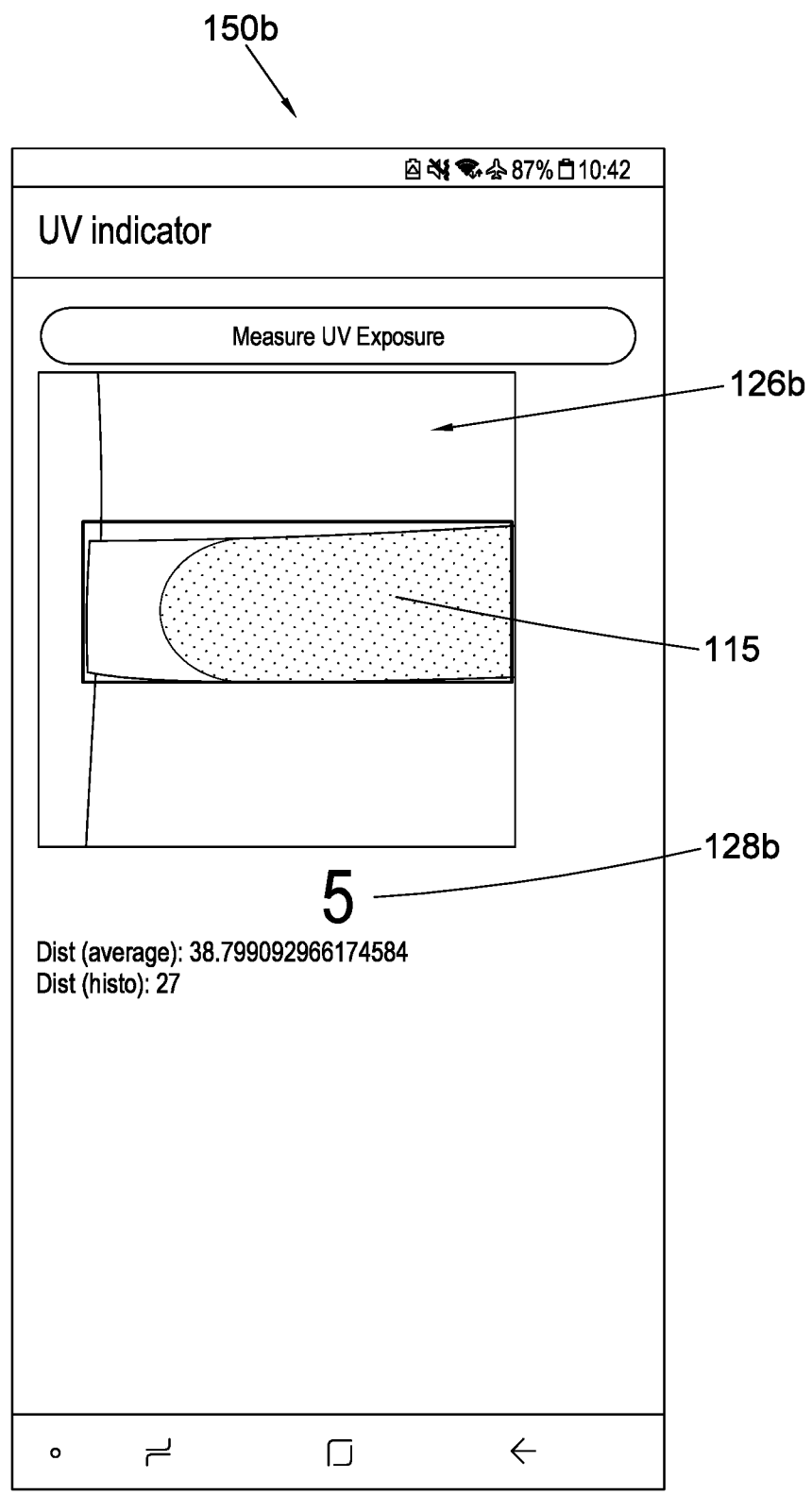
FIG. 3 a screenshot of an output on the indicator of FIG. 2, after exposure of the indicator to a dose of UV radiation.

Referring now to FIGS. 2 and 3, there is shown a screenshot 150a of a smartphone screen using an app according to an embodiment. In this embodiment, the colourimetric indicator is provided on a support in the form a wristband 110. An image 126a of the wristband 110 is acquired and is displayed in the screenshot 150a. Following conversion of the colour of the indicator on the wristband 110 into L*a*b* scale, the resulting colour value was compared to a reference data corresponding to this particular indicator, and a quantitative output 128a was generated. In this case, as no colour change occurred in the indicator, the output was "1", signifying that no colour change had occurred.

In FIG. 3, after exposure of the indicator 115 on the wristband 110 to a dose of UV radiation, another image 126b was acquired and displayed on screenshot 150b. Following conversion of the colour of the indicator 115 on the wristband 110 into L*a*b* scale, the resulting colour value was compared to the same reference data used in FIG. 2, and a quantitative output 128b was generated. In this case, as exposure to UV radiation caused a visible colour change, the output was "5", signifying that a significant colour change had occurred.

Figure 4:
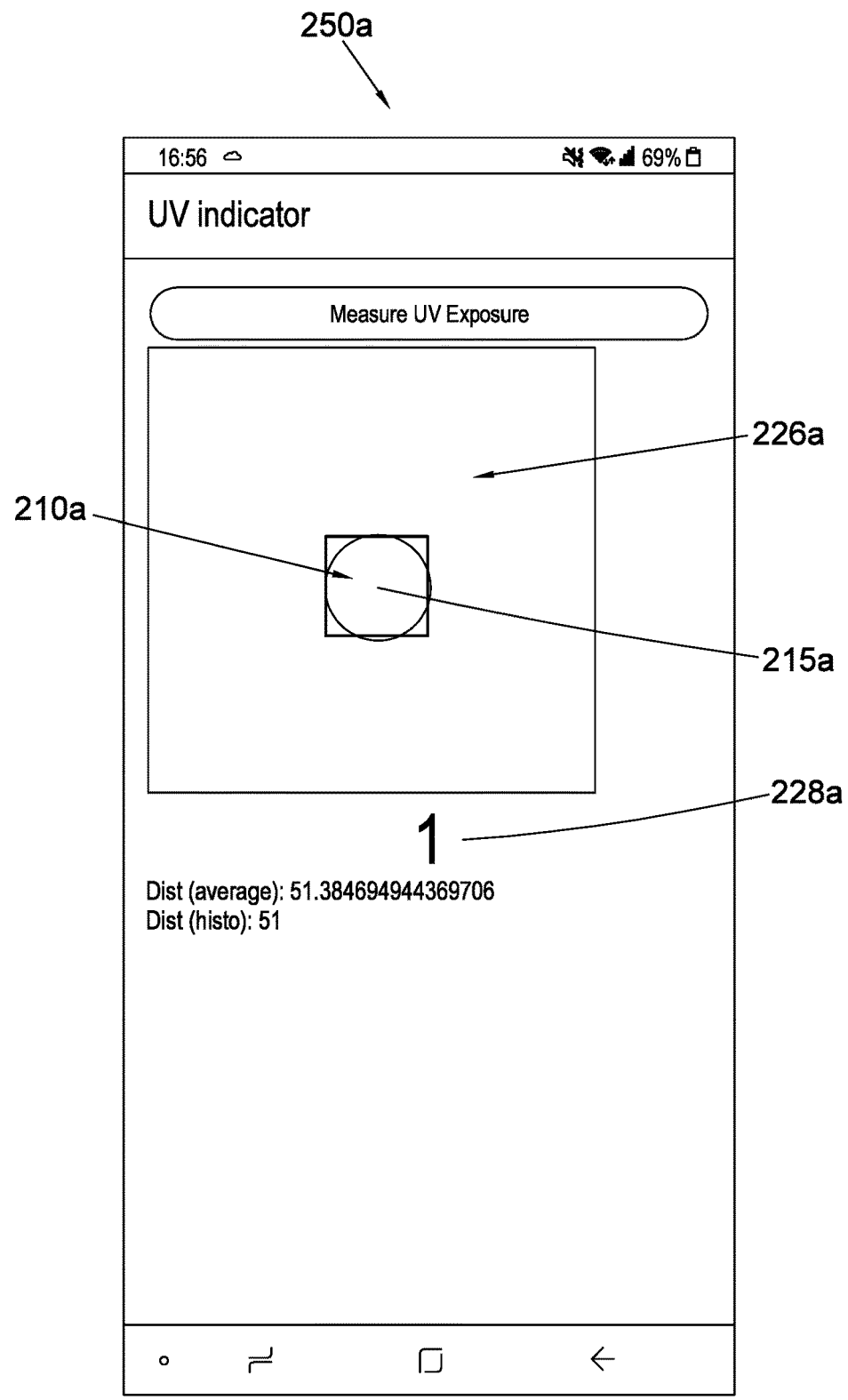
FIG. 4 a screenshot of an output using the system of FIG. 1 on a second indicator, before exposure of the indicator to UV radiation.
Figure 5:
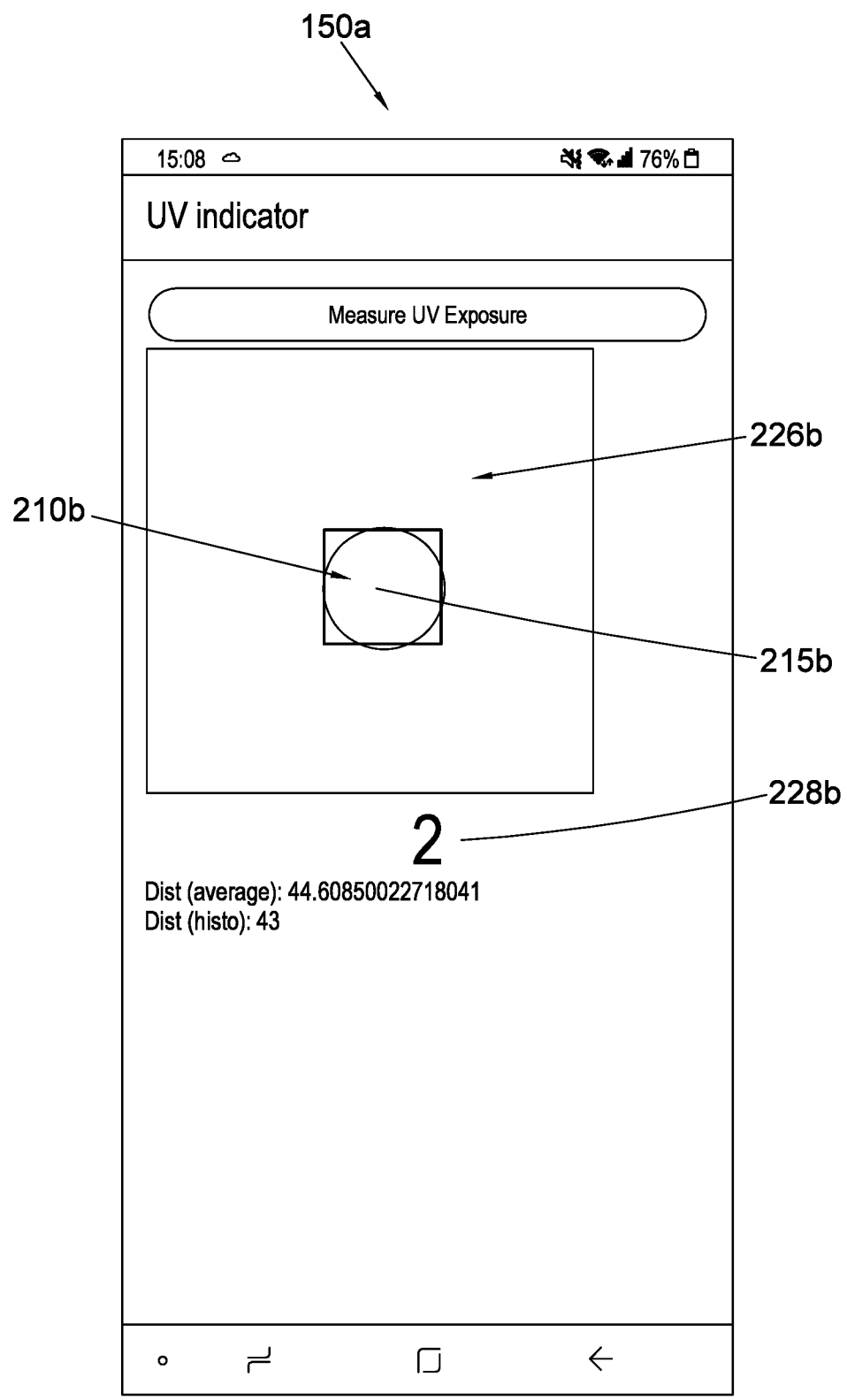
FIG. 5 a screenshot of an output on the indicator of FIG. 4 after exposure of the indicator to a dose of UV radiation.

FIGS. 4 and 5 are similar to FIGS. 2 and 3, but using a different colourimetric indicator, show as 215a, 215b, which in this embodiment is supported on a circular patch 210. In FIG. 4, the image 226a was acquired before exposure to UV radiation, and no colour change had occurred, thus leading to the generation of a quantitative output 228a ("1") corresponding to a lack of colour change. However, in FIG. 5, following exposure to a certain level of UV radiation, a small colour change in the indicator 215b was observed, leading to the generation of a quantitative output 228b ("2") corresponding to a relatively small colour change.

Figure 6:
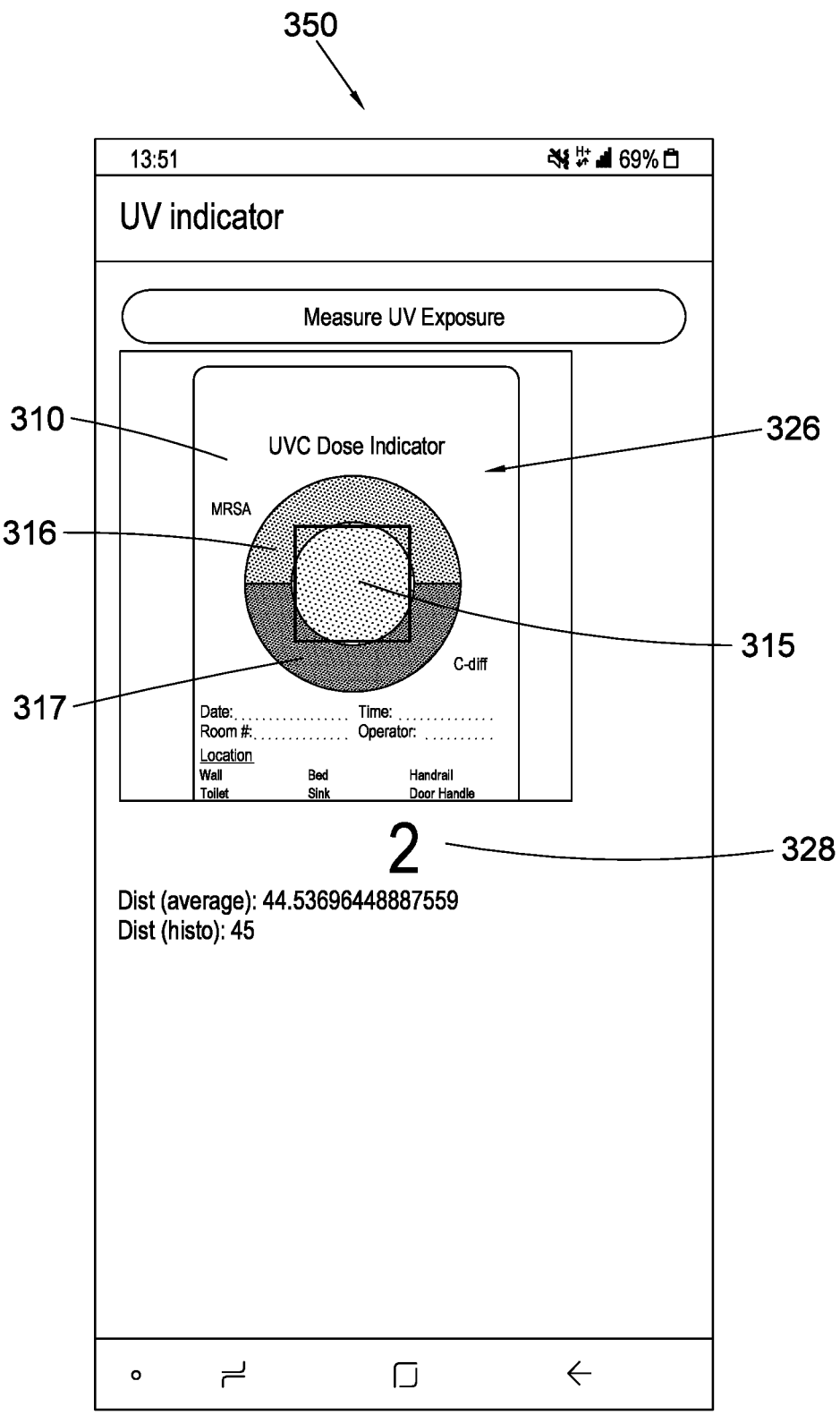
FIG. 6 a screenshot of an output using the system of FIG. 1 on a third indicator, after exposure of the indicator to a dose of UVC radiation.

Referring now to FIG. 6, yet another indicator 315 was used. In this embodiment, the support 310 carrying the indicator 315 further has reference regions 316 and 317 which provide a user with additional visual aid to assess a potential change in colour. In this embodiment, region 316, shown in orange, is a reference region provided in a colour which matches the colour that the indicator is expected to reach after exposure to a predetermined level of UV irradiation, here corresponding to a level sufficient to kill all "MRSA" bacteria. The support also has another region 317, shown in pink, which is a reference region provided in a colour which matches the colour that the indicator is expected to reach after exposure to a predetermined (but different to region 316) level of UV irradiation, here corresponding to a level sufficient to kill all "C-Diff" bacteria. In this embodiment, following exposure to a low level of UV radiation, the indicator 315 displayed (in image 326) a small colour change compared to its initial state, leading to the generation of a quantitative output 328 ("2") corresponding to a relatively small colour change. Although the quantitative output expresses a reliable means of assessing the colour change to a user, the additional reference regions 316 and 317 provide an additional and convenient means of cross-checking the analytical and quantitative output 328, thus further improving reliability. For example, although the user would know that the value "2" in the output 328 corresponds to a corresponding level of UV exposure which in this case would not be sufficient to kill MRSA of C-Diff, the additional reference regions 316 and 317 provide an additional and convenient means of cross-checking this result.

Figure 12:
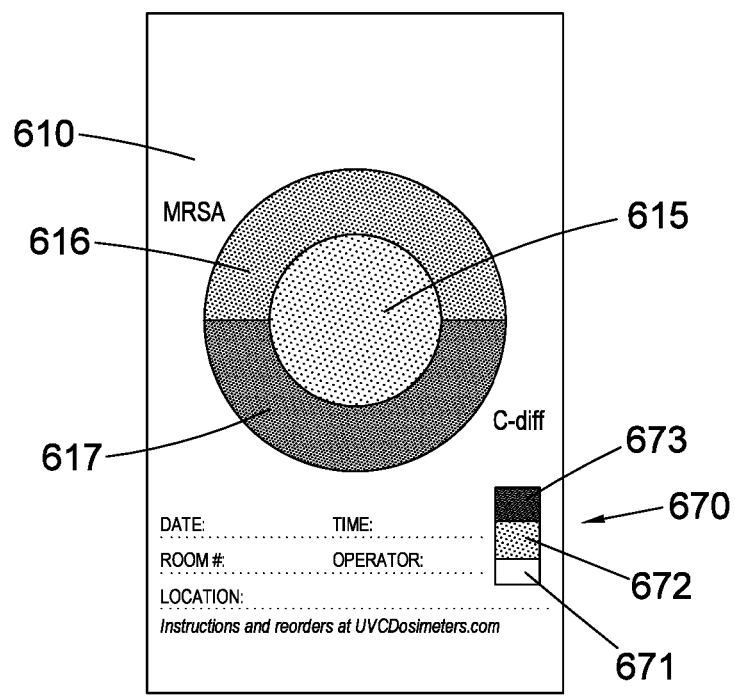
FIG. 12 an alternative embodiment of a card configured to be used in the system of FIG. 1.

Referring now to FIG. 12, there is shown another embodiment of a support 610 for use in the system 5 of FIG. 1. In this embodiment, the support 610 carrying the indicator 615 is a card 610 which is similar to the support 310 of FIG. 6, like parts denoted by like numerals, incremented by '300'. However, in this embodiment, the card 610 also has a normalisation region 670.

The purpose of the normalisation region 670 is to adjust measurement of the colour of indicator region 615 based on ambient light conditions, such as brightness. The normalisation region 670 contains three separate portions, each corresponding to a specific colour. In this embodiment, the normalisation region 670 is a grey-scale region and consists of a white portion 671, a 50% grey portion 672 and a black portion 673. Without wishing to be bound by theory, it is believed that the apparent brightness to an observer of a matt grey surface is independent from the observer's viewing angle. Thus, the provision of a grey-scale reference region provides a standard portion for normalisation during image capture. In addition to providing a means for measuring exposure, a grey scale reference region 670 provides a convenient reference for white balance, or colour balance, allowing the camera to compensate system 5 for varying illumination sources at the time of image capture.

The grey scale reference region 670 may be used for in-camera white balance processing or post-processing. In use, for instant normalisation, when an image of card 610 is captured (and in particular of the indicator 615), an image of the grey scale reference region 670 is also captured and used to adjust white balance for a number of images, and in particular for the images captured as the same time as the grey scale reference region 670. In the case of post-processing normalisation, an image of the grey scale reference region 670 is taken when the image of the card 610 is taken (and in particular of the indicator 615), and an image processing software uses the data from the pixels in the grey scale reference region 670 of the captured image to adjust light balance for the whole image captured.

Figure 18:
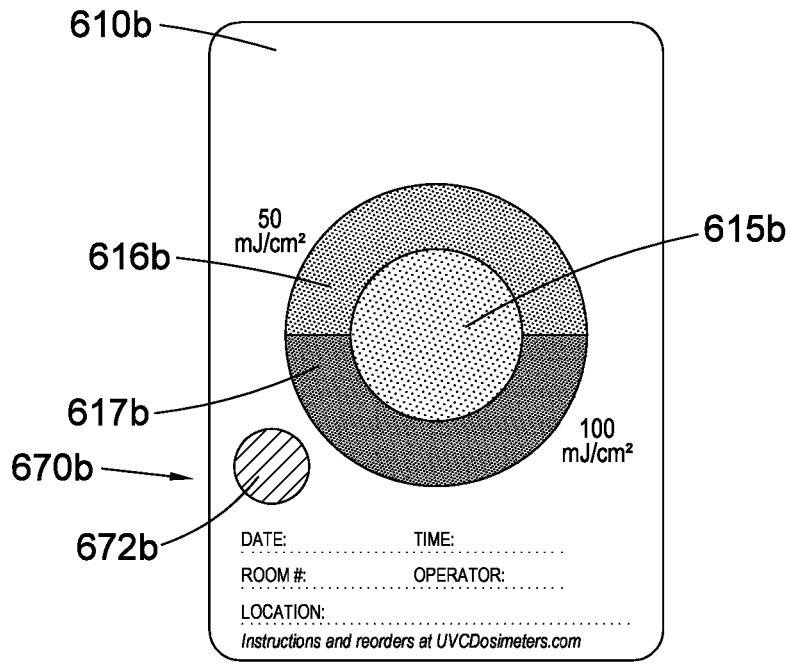
FIGS. 18 and 19 alternative embodiments of the card of FIG. 12.
Figure 19:
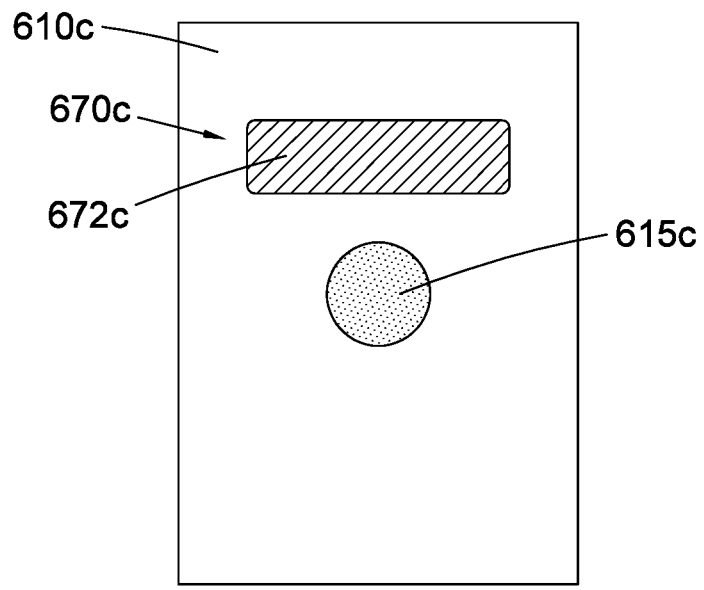

Alternative embodiments of the card 610 of FIG. 12 are shown in FIGS. 18 and 19, like parts denoted by like numerals, but supplemented by "b" ad "c" respectively.

In the embodiment of FIG. 18, card 610b includes a normalisation region 670b which has a single grey-scale portion 672b. In this embodiment, the grey portion 672b has a colour value (in CMYK) of C51, M43, Y30 and K59, which was found to provide optimum results in terms of quality and reliability.

In the embodiment of FIG. 19, card 610c includes a printed normalisation region 670c which has a single grey-scale portion 672c, as in FIG. 18. In this embodiment, the indicator 615c is in the form of a disc 615c which can be placed on the card 610c before an image is captured.

Figure 14:
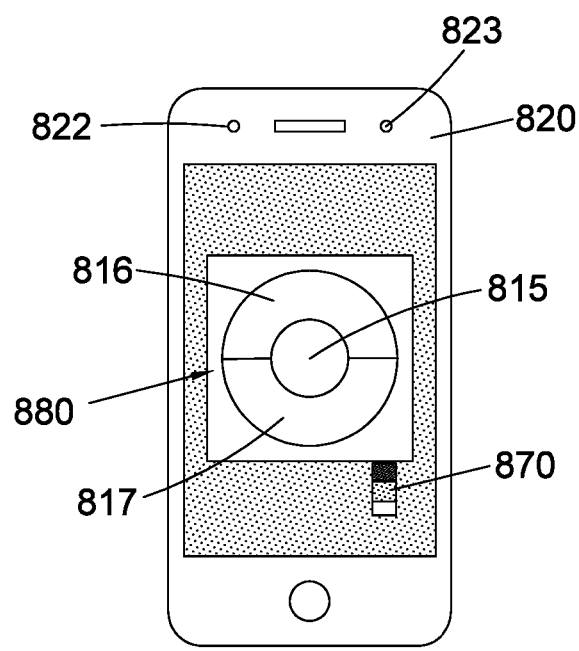
FIG. 14 an illustration of a template for use in the system of FIG. 1.

FIG. 14 shows an illustration of a template 880 for use in the system of FIG. 1. If different types of indicator are available, then a user choses the type of indicator being used, as explained in relation to FIG. 13. The processing device 820 then displays an electronic template 880 on its screen. The purpose of the template 880 is to help a user superimpose the template with the object 610 before an image of the object 610 is captured. Advantageously, this may improve the reliability of the image capture by ensuring the conditions under which an image is captured, e.g. angle, distance, etc, are similar.

In this embodiment, the template 880 of FIG. 14 is a template for use with the card 610 of FIG. 12. Thus, using the template 880, a user is assisted in placing the camera of the processing device 820 over the card 610. This may help ensure accurate and reliable image capture of the various parts of the card 610, including in particular indicator portion 615 (superimposed with indicator portion template 815), and optionally, if present, reference portions 616, 617 (superimposed with reference portions template 816, 817) and/or normalisation region 670 (superimposed with normalisation region template 870).

Figure 15:
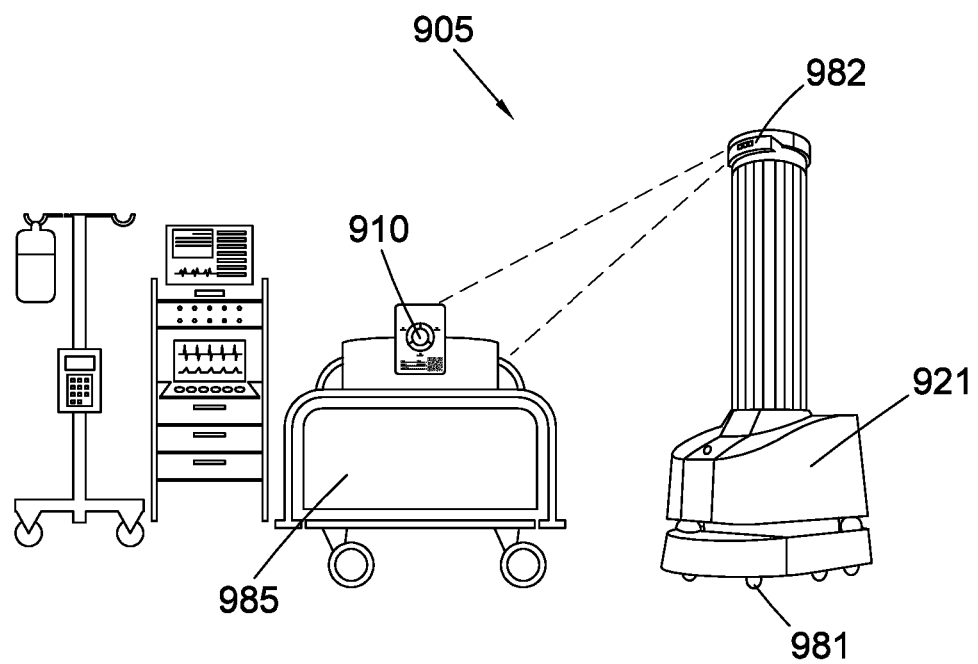
FIGS. 15 to 17 schematic views of a system according to another embodiment.
Figure 16:
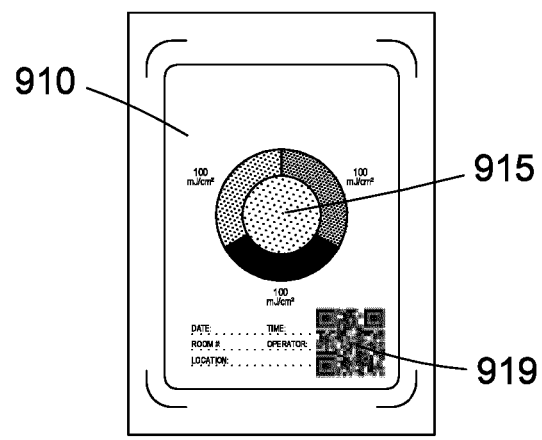
Figure 17:
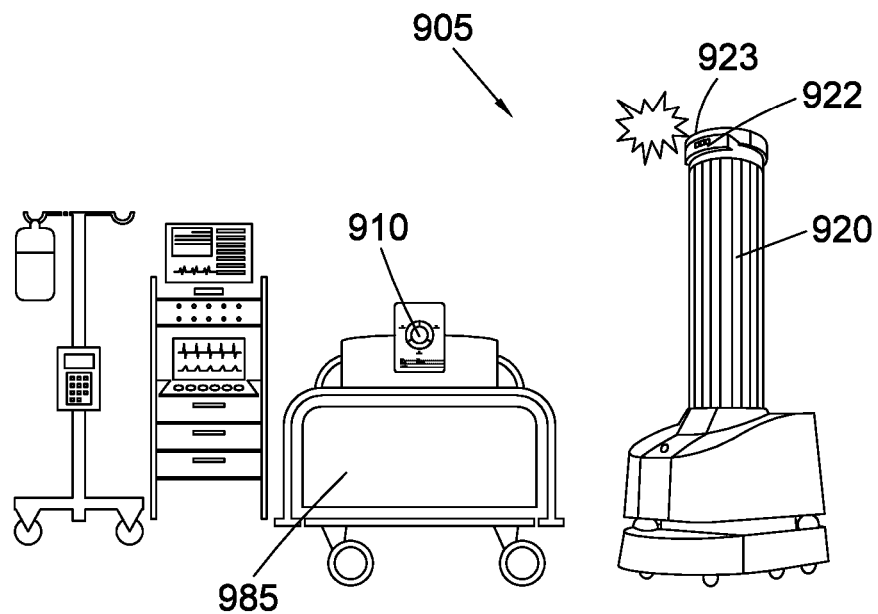

Referring to FIGS. 15 to 17 there is shown a system 905 for quantifying a colour change according to another embodiment. The system 905 is generally similar to the system 5 of FIG. 1, like parts being denoted by like numerals, but incremented by '900'.

The system 905 includes a mobile monitoring device in the form of a robot 921. The robot is mounted on wheels 981 and is battery-powered such that it is able to move within a predetermined area which in this embodiment is a hospital room. The room is exposed to continuous or intermittent exposure to UVC radiation for sterilization purposes. A UVC dosimeter card 910 (similar to the card 310 of FIG. 6 or the card 610 of FIG. 12) is located on a tray 985. As the room is exposed to continuous or intermittent exposure to UVC radiation for sterilization purposes, the UVC dosimeter card 910, and in particular indicator portion 915, reacts and changes colour in response to the exposure dose of UVC radiation.

The UVC dosimeter card 910 is shown in more detail in FIG. 16.

The UVC dosimeter card 910 also has a reference mark 919 which in this embodiment is in the form of a QR code. The QR code 919 may contain information relating to the nature of the object, the location of the object, etc.

In use, the robot 921 moves around the room searching for objects to be processed. The robot includes a camera 982 which is able to scan for objects to be processed. As shown in FIG. 15, when UVC indicator card 910 is within the field of view of camera 982, robot 921 stops and scans QR code 919 for information.

The robot 921 can then process the UVC indicator card 910 in similar fashion as described above in relation to the system of FIG. 1. In particular, as shown in FIG. 17, the robot 921 acquires an image of the card 910 (and in particular of indicator portion 915) using integrated camera 922, under illumination by integrated flash 923. The robot 921 then generates a quantitative output associated with the acquired image, using an integrated processing device.

In some embodiments, the robot 921 is configured to send a signal or command, based on the quantitative output associated with the card 910. In particular, if the quantitative output generated by the robot 921 is below a predetermined level, the robot 921 may send a command or signal that may trigger an increase in the level or dose of UVC in or near the location of the indicator card 910. If the quantitative output generated by the robot 921 is above below a predetermined level, the robot 921 may send a command or signal that may trigger a decrease in the level or dose of UVC in or near the location of the card 910. If the quantitative output generated by the mobile monitoring apparatus, e.g. robot, is at or near a predetermined level, the mobile monitoring apparatus, e.g. robot, may either not send any a command or signal or may send a command or signal that may trigger maintenance of the level or dose of UVC in or near the location of the card 910.

In some embodiments, the robot 921 may be configured to send or transmit the quantitative output to a receiving unit (not shown), e.g. by Wi-Fi, Bluetooth, or the like, which can then be reviewed by an end user.

It will be appreciated that the embodiments of the invention hereinbefore described are given by way of example only and are not meant to limit the scope thereof in any way.

Method steps of the invention can be performed by one or more programmable processors executing a computer program to perform functions of the invention by operating on input data and generating output. Method steps can also be performed by special purpose logic circuitry, e.g., an FPGA (field programmable gate array) or an ASIC (application-specific integrated circuit) or other customised circuitry. Processors suitable for the execution of a computer program include CPUs, Graphics Processing Units (GPUs), maths co-processors, and microprocessors, and any one or more processors. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. The processor may receive the data via a data bus or by other communications forms, such as wirelessly. Information carriers suitable for embodying computer program instructions and data include all forms of non-volatile memory, including by way of example semiconductor memory devices, e.g. EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the invention can be implemented on a device having a screen, e.g., a CRT (cathode ray tube), plasma, LED (light emitting diode) or LCD (liquid crystal display) monitor, for displaying information to the user and an input device, e.g., a keyboard, touch screen, a mouse, a trackball, and the like by which the user can provide input to the computer. Other kinds of devices can be used, for example, feedback provided to the user can be any form of sensory feedback, e.g., visual feedback, auditory feedback, or tactile feedback; and input from the user can be received in any form, including acoustic, speech, or tactile input.

The invention claimed is:

1. A system for quantifying a color change in a colorimetric UV indicator, the system comprising:
   an image capture device configured to acquire an image of an object comprising the colorimetric UV indicator; and
   a processing device configured to compare the acquired image to digital or electronic reference data associated with the colorimetric UV indicator, and generate a quantitative output associated with the acquired image, wherein the quantitative output is representative of the color change in the colorimetric UV indicator.

2. A system according to claim 1, wherein processing device is capable of accessing a plurality of digital or electronic reference data sets, each data set being associated with a respective colorimetric indicator.

3. A system according to claim 1, wherein the system comprises a portable user device or a mobile monitoring apparatus, the portable user device or the mobile monitoring apparatus comprising the image capture device and/or processing device.

4. A system according to claim 3, wherein the image capture device comprises a camera of the portable user device or of the mobile monitoring apparatus.

5. A system according to claim 1, wherein the processing device is configured to perform image analysis of the acquired image.

6. A system according to claim 1, wherein the processing device is configured to compare the color of the acquired image with colors of the digital or electronic reference data associated with the colorimetric indicator.

7. A system according to claim 6, wherein the colors of the reference data are stored, expressed and/or converted in a standard color scale.

8. A system according to claim 6, wherein the color of the acquired image is converted, expressed and/or stored in a standard color scale.

9. A system according to claim 1, wherein the quantitative output is associated with the color of the captured image.

10. A system according to claim 1, wherein the object further comprises at least one reference color region, the at least one reference color region corresponding a color of the indicator in a predetermined state, and wherein the system is configured to capture an image of the at least one reference color region.

11. A system according to claim 1, wherein the system is configured to illuminate the object during image capture at a predetermined light intensity.

12. A system according to claim 1, wherein the system is configured to normalise the captured image, wherein normalisation is performed by capturing an image of a normalisation region on the object.

13. A system for quantifying a color change in a colorimetric UV indicator, the system comprising:
   an object comprising a colorimetric UV indicator;
   an image capture device configured to acquire an image of the object and/or of the colorimetric UV indicator; and
   a processing device configured to compare the acquired image digital or electronic to reference data associated with the colorimetric UV indicator, and generate a quantitative output associated with the acquired image, wherein the quantitative output is representative of the color change in the colorimetric UV indicator.

14. A method for quantifying a color change in a colorimetric UV indicator, wherein the method comprises:
   acquiring an image of an object comprising a colorimetric UV indicator;
   comparing the acquired image to digital or electronic reference data associated with the colorimetric UV indicator; and
   generating a quantitative output associated with the acquired image, wherein the quantitative output is representative of the color change in the colorimetric UV indicator.

15. The method of claim 14, comprising acquiring the image using an image capture device, processing the image using a processing device, and comparing the acquired image to the digital or electronic reference data using the processing device.

16. The method of claim 14, comprising the preliminary step of selecting the type of object or indicator to be captured by the image capture device.

17. The method of claim 14, comprising using a template on the image capture device in order to locate the image capture device relative to the object prior to acquiring the image.

18. The method of claim 14, comprising normalising the acquired image.

19. A computer program comprising instructions which, when the program is executed by a processing device, causes the processing device to:
   acquire an image of an object comprising a colorimetric UV indicator;
   compare the acquired image to digital or electronic reference data associated with the colorimetric UV indicator; and
   generate a quantitative output associated with the acquired image, wherein the quantitative output is representative of the color change in the colorimetric UV indicator.

20. A computer-readable storage medium comprising the computer program of claim 19.

* * * * *